(No Model.)

C. A. TARRAGON.
PORTABLE CORRAL.

No. 256,661. Patented Apr. 18, 1882.

WITNESSES:
Chas. Nida
C. Sedgwick

INVENTOR:
C. A. Tarragon
BY Munn & Co
ATTORNEYS.

UNITED STATES PATENT OFFICE.

CHARLES A. TARRAGON, OF THE DALLES, OREGON.

PORTABLE CORRAL.

SPECIFICATION forming part of Letters Patent No. 256,661, dated April 18, 1882.

Application filed December 7, 1881. (No model.)

*To all whom it may concern:*

Be it known that I, CHARLES AUGUEST TARRAGON, of The Dalles, in the county of Wasco and State of Oregon, have invented a new and Improved Portable Corral for Sheep, Horses, and other Animals, of which the following is a full, clear, and exact description.

Figure 1:
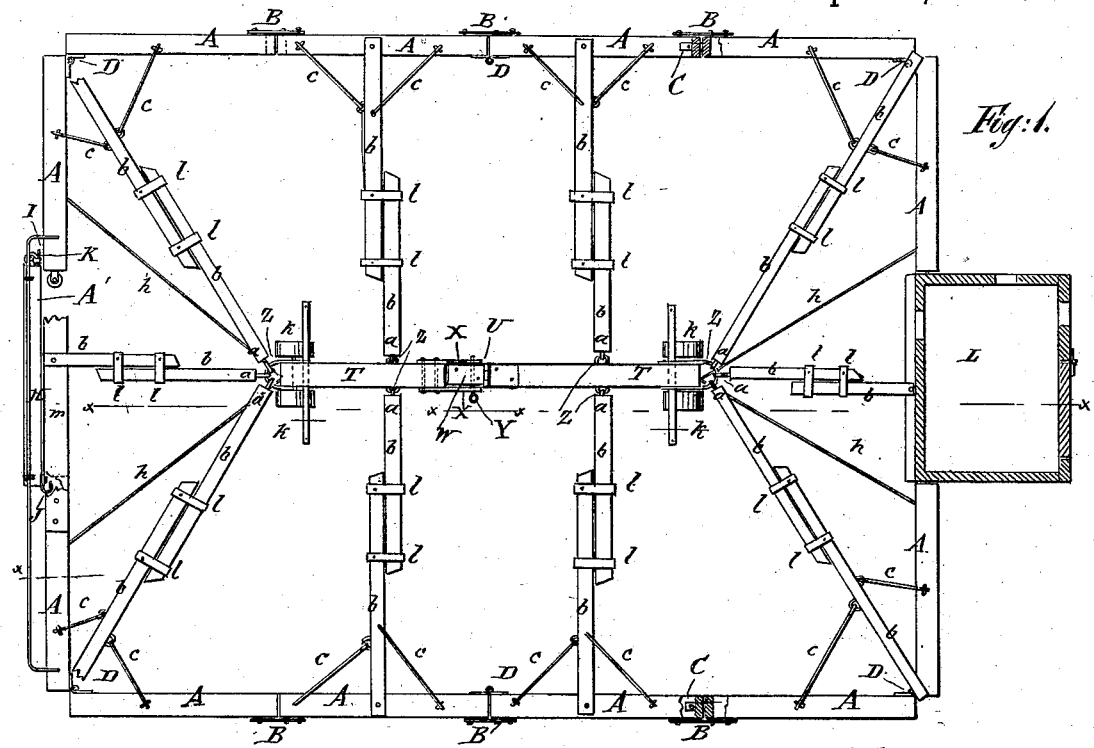
Figure 2:
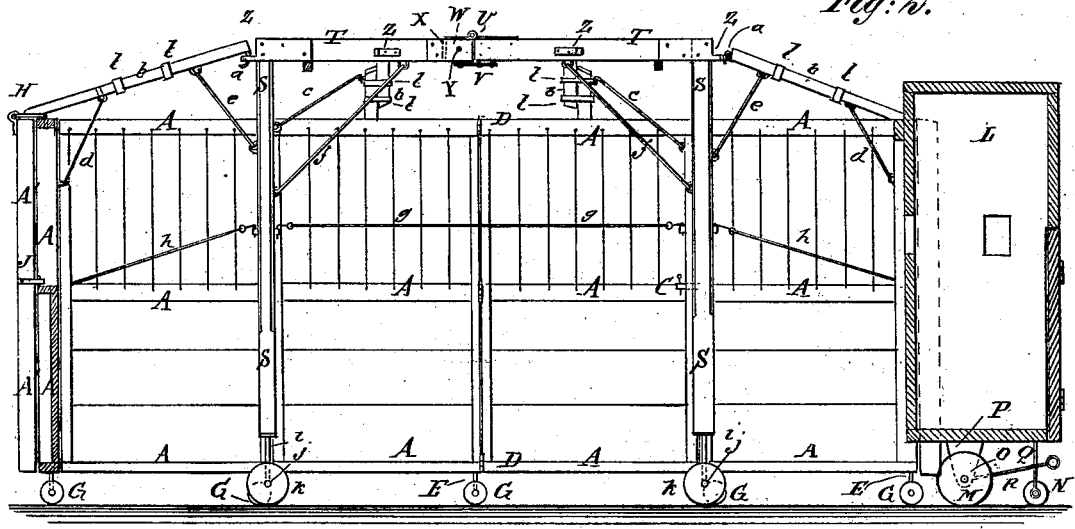
Figures 3, 4, 5:
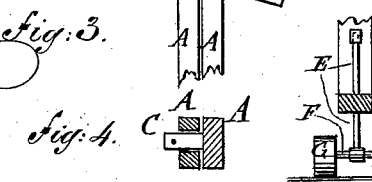

Figure 1 is a plan view of my improvement, the cabin being shown in section. Fig. 2 is a sectional side elevation of the same, taken through the line $x$ $x$, Fig. 1. Fig. 3 is a side elevation of the upper corners of two adjacent panels, showing the locking-latch. Fig. 4 is a cross-section of the adjacent side bars of two panels, showing the fastening-pin. Fig. 5 shows a pair of supporting-wheels attached to a panel.

The object of this invention is to facilitate the corraling of sheep, horses, and other animals.

The invention consists in constructing a portable corral with separate panels mounted upon wheels, center posts, also having wheels, and connected by a bar, extensible braces, hook-rods, and tie-ropes; also, in the combination, with the separate panels, of a cabin mounted upon wheels; and also in the combination, with the adjacent panels, of latches and pins, whereby the said panels are held from longitudinal and lateral movement, as will be hereinafter fully described.

The corrals may be made any desired length and breadth, as the number of animals to be corraled may require. The sides and ends of the corral are formed of equal panels A, a convenient size for which is fifteen feet long and five feet high. Each panel A is formed of a frame, having its lower part for a space of two feet (more or less) closed with boards and the upper part closed with parallel or interlaced wires, as shown in Fig. 2. The adjacent panels are connected at their upper and lower corners by lever-latches B, pivoted to the end bars of one of the panels, and having hooks or shoulders upon the opposite sides of their ends to hook upon pins attached to the adjacent panels, as shown in Fig. 3. The latches B hold the panels A from being separated longitudinally. The panels A are held from lateral movement by pins C, passed through the adjacent side bars of the panels, and secured by keys, as shown in Figs. 1, 2, and 4. Instead of using the latches B and pins C, the panels can be constructed to close automatically. The adjacent panels, at the corners of the corral, are secured to each other by hinges D, which may be made with removable or hook pintles, if desired. The side and end panels A can be connected in pairs by hinges D, so that they can be folded together for convenience in handling.

To the bottom bar and the inner side of the side bar of each panel A is swiveled a rod, E, to the lower end of which is attached or pivoted a short axle, F, having a wheel, G, about six inches wide and two feet in diameter, upon each end. The center panel, A', at one end of the corral, forms the door, and is connected at its upper end with a rod, H, to keep the said upper end in place, the adjacent panels being kept in place by a bar, m, attached to their tops.

The door can be secured in place by a hasp and keeper, I, at its forward edge and a hook and keeper, J, at its rear edge, or by other suitable fastenings.

To supports attached to the forward side bar of the door A', and to the side bar of the panel adjacent to the said forward edge of the door, are pivoted upright rollers K, to facilitate the passage of crowding animals through the doorway, and to prevent the wool of the sheep from being injured should the sheep be crowded against the sides of the doorway in passing into and out of the corral. At the other end of the corral a part or the whole of the center panel is removed and is replaced by a cabin, L, to shelter the herder, which cabin is supported upon wheels M, about six inches wide and eighteen inches in diameter. The axle O of the wheels M is secured to brackets P, attached to the bottom of the cabin L, and the standard Q of the wheel N is also connected with the said bottom.

To the axle O and standard Q is attached the rod or bar R, to which the draft is applied for moving the corral. Upon the central line of the corral, at a distance of about twenty feet from each end, is placed a post, S. The upper ends of the posts S are connected by a bar, T, which is made in two parts, connected by a hinge, U, and held in line by a latch, V. One of the parts of the bar T can be made with a short key-piece, W, to which the hinge U is attached, and which is connected with the body of the said part by straps X and pins Y, so that the parts of the bar can be separated by knocking out the said pins.

To the tops of the posts S and to the sides of the bar T are attached keepers Z, to receive the hooks a, attached to the inner ends of the top braces or rafters, b, the outer ends of which rest upon the top bars of the panels A, where they are secured in place by hook-rods c, hinged to the said top bars and hooking into holes in the braces b, or into keepers attached to the said braces, and by the hook-rods d, hinged to the side bars of the panels A and hooking into keepers attached to the said braces. The inner ends of the corner braces are further secured in place by the hook-rods e, hinged to the said braces and hooking into keepers attached to the posts S.

The connection between the posts S and the connecting-bar T is strengthened by the hook-rods f, hinged to the said bar T, and hooking into keepers attached to the said posts S. The corral is further strengthened by the tie-ropes g and h. The tie-rope g has hooks attached to its ends to hook into keepers attached to the posts S. The tie-ropes h have hooks attached to their inner ends to be hooked into keepers attached to the posts S, and their outer ends are attached to the side panels A of the ends of the corral.

To the lower ends of the posts S are swiveled standards i, to the lower ends of which are attached the centers of the axles j of the pairs of wheels k. The wheels k are about six inches wide and two feet in diameter. The top braces or rafters, b, are each made in two parts, the adjacent ends of which overlap each other, the one part sliding in keepers l, attached to the other part, and being kept in place by pins or other suitable fastenings. By this construction the top braces, b, can be lengthened or shortened, according as a larger or smaller corral may be required.

The top braces can be further strengthened in place by ropes crossing from the top and bottom ends of each brace to the bottom and top ends of the adjacent braces, which ropes will form an additional support for a canvas covering that may be spread over the corral, if desired. With this construction the corral can be readily drawn from place to place without being taken down. When moved long distances it can be taken down and packed compactly.

The roof can be raised by means of pulleys, one pulley being pivoted to each center post.

Having thus described my invention, what I claim as new, and desire to secure by Letters Patent, is—

1. A portable corral, constructed substantially as herein shown and described, consisting of the separate panels A, having wheels G, the posts S, having wheels k, and connected by a bar, T, the extensible braces b, the hook-rods c d e f, and the tie-ropes g h, as set forth.

2. In a portable corral, the combination, with the separate panels A, of the cabin L, mounted upon wheels M N, substantially as herein shown and described, whereby the said cabin can be moved with the corral, as set forth.

3. In a portable corral, the combination, with the adjacent panels A, of the latches B and the pins C, substantially as herein shown and described, whereby the said panels are held from longitudinal and lateral movement, as set forth.

CHARLES AUGUEST TARRAGON.

Witnesses:
J. B. CONDON,
H. C. CONDON.